United States Patent [19]

Login et al.

[11] 4,165,405
[45] Aug. 21, 1979

[54] FIBER LUBRICANTS BASED UPON FATTY ESTERS OF HETERIC POLYOXYALKYLATED ALCOHOLS

[75] Inventors: Robert B. Login; David D. Newkirk, both of Woodhaven, Mich.

[73] Assignee: BASF Wyandotte Corporation, Wyandotte, Mich.

[21] Appl. No.: 809,159

[22] Filed: Jun. 23, 1977

Related U.S. Application Data

[63] Continuation-in-part of Ser. No. 797,007, May 16, 1977, abandoned.

[51] Int. Cl.² .......................... B05D 1/28; C08K 5/10; D06M 3/38; D06M 5/08
[52] U.S. Cl. ...................................... 428/395; 252/8.9; 260/31.4 R; 427/428
[58] Field of Search .......................... 428/395; 252/8.9; 260/31.4; 427/428, 434

[56] References Cited

U.S. PATENT DOCUMENTS

| | | | |
|---|---|---|---|
| 2,425,755 | 8/1947 | Roberts et al. | 260/615 B |
| 2,457,139 | 12/1948 | Fife et al. | 260/615 B |
| 3,446,734 | 5/1969 | Coats | 428/395 |
| 3,578,594 | 5/1971 | Dombrow | 428/395 |
| 3,925,588 | 12/1975 | Marshall et al. | 428/395 |
| 3,959,187 | 5/1976 | Kardol | 252/8.9 |

*Primary Examiner*—J. C. Cannon

*Attorney, Agent, or Firm*—Andrew E. Pierce; Joseph D. Michaels; Robert E. Dunn

[57] ABSTRACT

Lubricants, or processing aids, for synthetic fibers, particularly polyester and nylon fibers and most particularly for polyester fibers, are disclosed comprising a capped heteric polyoxyalkylene monoester having the formula:

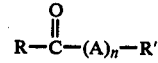

in which R is an aliphatic group having about 7 to about 22 carbon atoms; A is a mixture of oxyethylene and oxypropylene residues derived from the reaction of ethylene oxide and 1,2-propylene oxide in the respective ratio by weight of 3:7 to 4:1; n has a value to produce a molecular weight of about 300 to about 3000 and R' is derived from a monofunctional compound containing an OH group, preferably a monofunctional aryl alcohol or a monofunctional alkyl or arylalkyl alcohol, all having 1 to about 21 carbons in the alkyl chain.

Certain embodiments of the invention are particularly suited by their low viscosity for application to synthetic textile fibers or yarn without dilution in water. Unexpectedly, the fiber lubricants, or processing aids, of the invention volatilize without leaving a residue when they contact heated metal surfaces during the fiber processing operation and are characterized by smoke points of 160° C. or above.

9 Claims, No Drawings

FIBER LUBRICANTS BASED UPON FATTY ESTERS OF HETERIC POLYOXYALKYLATED ALCOHOLS

CROSS-REFERENCE TO RELATED APPLICATION

This application is a continuation-in-part of our copending application Ser. No. 797,007, filed May 16, 1977, and now abandoned.

BACKGROUND OF THE INVENTION

1. Field of the Invention

This invention relates to the false twist processing of multi-filament and mono-filament synthetic fibers, particularly polyester and nylon fibers with fiber processing aids applied as spin-finishes subsequent to extrusion of the fibers from the spinneret.

2. Description of the Prior Art

In the production of polyester and polyamide filament, the addition of a chemical coating after extrusion from the spinneret is essential in order to process the emerging filaments into fibers. These coatings are termed in the art "Spin-Finishes" and since the introduction of the first synthetic fiber the provision of such processing aids or lubricants has involved considerable effort on the part of producers of lubricant compositions. It was realized early that the polyoxyethylene glycols obtained either by reaction of ethylene oxide with an aliphatic monocarboxylic acid or a mono- or dihydroxy alcohol would provide a lubricant having a balance of properties besides lubricity that would suit such materials for this application. For instance, water solubility or dispersibility, heat stability and the ability of the lubricant to impart a degree of antistatic properties to the synthetic filament are desirable in addition to the property of lubricity which is the prime consideration in the selection of such fiber lubricants.

Over the years, fiber lubricants for synthetic filaments and yarn have utilized, either alone or in mixtures, such alkylene glycol derivatives as the alkoxylated stearic acid esters disclosed in U.S. Pat. No. 2,910,490 and U.S. Pat. No. 1,970,578 or a polyoxypropylene compound having 10 to 20 recurring units as capped by a lower alkyl or lower acyl group as disclosed in U.S. Pat. No. 3,446,734. Recently, esters of an ethoxylated alcohol have been disclosed for use in admixture with other lubricant components as fiber treating compositions as disclosed in U.S. Pat. No. 3,578,594.

There is a current tendency toward the use of heteric polyoxyalkylenes as components of fiber lubricants. These have low viscosity at room temperature and their viscosity does not change appreciably upon heating to elevated temperatures during processing of the synthetic fiber. Such compositions are disclosed in U.S. Pat. No. 2,425,755 as mixtures of polyoxyalkylene compounds which are aliphatic monoethers of polyoxyalkylene glycols. These compositions are composed of mixtures of oxyethylene and oxypropylene groups in the chain and contain at least one-third part of propylene oxide for each part of ethylene oxide. Similar compositions based upon aliphatic diols are disclosed in U.S. Pat. No. 2,425,845. Heteric polyoxyalkylene monoethers having polyoxyalkylene hydroxyl groups blocked with the residue of a lower alkyl or an acyl group are disclosed in U.S. Pat. No. 3,756,972 and U.S. Pat. No. 3,338,830.

It was not until the disclosure of U.S. Pat. No. 2,457,139 that further reduction in viscosity at ambient temperatures was obtained by reacting the oxyalkylene diols of U.S. Pat. No. 2,425,755 with $C_4$ to $C_{18}$ fatty acids. It was then realized that the advantageous lubricating effects of a higher fatty acid such as stearic acid could be obtained in combination with the lubricating effect of the oxyalkylene moiety by reacting an oxyalkylene glycol with a fatty acid to produce a heteric polyoxyalkylene glycol lubricant for polyester yarn as disclosed in U.S. Pat. No. 3,925,588 and German Offen. No. 2,516,736. Such products were substantially improved with respect to reduced viscosity as compared to the ethoxylated fatty acid esters long known to the art as illustrated by the compositions disclosed in U.S. Pat. No. 2,910,490, cited above. Such lubricant compositions while representing substantial advances over early prior art compositions would be of greater utility if further reduction in viscosity could be achieved so that such compositions could be applied without water dilution, if desired. Other prior art references of interest are: U.S. Pat. No. 3,539,518; U.S. Pat. No. 3,146,272 and U.S. Pat. No. 3,578,594.

SUMMARY OF THE INVENTION

It is a primary object of this invention to provide a fiber lubricating composition, or processing aid, useful with synthetic fibers such as polyester or nylon. When used as a single component lubricant or finish composition for the textile fiber, there is shown during false twist processing less tendency to exhibit smoking of the processing aid as compared to prior art processing aids. On contacting the heated metal surfaces during processing, volatilization occurs under appropriate conditions without the formation of resinous residues. The processing aid of the invention can be applied, if desired, without dilution in water since the lubricant has a considerably reduced viscosity at ambient temperatures as compared to compositions of the prior art utilized for this purpose. In addition, the processing aid of the invention exhibits self-emulsification properties to allow application as an aqueous dispersion and ease of removal in later processing of the fiber.

These and other objects are accomplished in accordance with this invention by utilizing a lubricant, or processing aid, for thermoplastic, synthetic fibers, preferably polyester and nylon filament or yarns comprising a capped heteric polyoxyalkylene monoester having the formula:

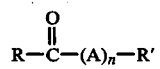

wherein R is an aliphatic group having 7 to 22 carbon atoms; A is a mixture of oxyethylene and oxypropylene residues derived from the reaction of ethylene oxide and 1,2-propylene oxide in the respective ratio by weight of 3:7 to 4:1, n has a value to produce a molecular weight of about 300 to about 3000, L and R' is derived from a mono-functional compound containing an OH group, preferably an aryl alcohol, or a monofunctional aliphatic or alkyl aromatic alcohol, all having 1 to 21 carbons in the alkyl chain wherein said condensation product is capped with said alcohol residue so as to eliminate the terminal hydroxyl group present in prior art polyoxyalkylene esters utilized as fiber lubricants. The viscosity increasing effect of the terminal hydroxyl group, as the result of hydrogen bonding, is thus eliminated.

DETAILED DESCRIPTION OF THE INVENTION AND OF THE PREFERRED EMBODIMENTS

Unexpectedly, the fiber lubricants of the invention provide a unique combination of excellent heat stability in a low viscosity, clean volatilizing, fiber lubricant. As mentioned above, it is believed that these advantages are obtained as the result of the capping of the terminal hydroxyl present in compositions of the prior art represented by the compositions disclosed in U.S. Pat. No. 3,925,588. Thus, ether-capped fiber lubricant compositions can be prepared having molecular weights of about 300 to about 3000 and beyond, preferably about 400 to about 1400 having a high smoke point but capable of clean volatilization upon contacting during processing heated metal surfaces maintained at or above the usual temperatures at which such fibers are drawn and crimped, for instance 200°–230° C. in the production of false twist, or textured, yarn. The maximum limitation for the molecular weight is believed only limited by the viscosity desired in such fiber lubricants. For instance, at the preferred molecular weight range and most preferably at a molecular weight of about 800 to about 1200, it is possible to apply the fiber lubricant of the invention to the fibers without diluting the fiber lubricant. However, since only a very small amount of lubricant is usually required for most operations (typically about 0.1% to about 1.5% by weight, preferably about 0.2% to about 0.8% and most preferably about 0.3% to about 0.6% by weight, all based upon the weight of the fiber), it is often convenient to dilute the lubricant by dissolving it or dispersing it in water or other carrier.

The fiber lubricants of the invention prepared using ethylene oxide and 1,2-propylene oxide as reactants at the preferred weight ratio of, respectively, about 3:1 to about 1:1 result in fiber lubricants having minimal viscosity at ambient temperatures. Increased dispersibility of the fiber lubricant in water can be obtained by altering the ratio of ethylene oxide to 1,2-propylene oxide, and useful products can be obtained having an even higher weight ratio of ethylene oxide to 1,2-propylene oxide such as about 4:1. However, too high a ratio of ethylene oxide results in solidification of the product. Alternatively, by reducing the proportion of ethylene oxide to that of 1,2-propylene oxide, fiber lubricants of the invention can be obtained which are less easily removed from the fiber.

The textile fiber lubricants of the invention can be obtained by first preparing a heteric polyoxyethylene-polyoxypropylene addition product by a simple addition reaction with an initiator containing an OH group. As an initiator, the compound containing an active hydrogen can be any monofunctional compound containing an OH group, preferably a monofunctional aryl alcohol or a monofunctional alkyl or arylalkyl alcohol and most preferably an alkyl or arylalkyl compound, all with 1 to about 21, preferably about 3 to about 12 and most preferably about 4 to about 6 carbon atoms in the alkyl chain.

Suitable initiators are selected from any monofunctional compound containing an OH group having 1 to about 21 carbons and include aliphatic monofunctional alcohols. These can be used either alone or in mixtures. Representative alcohols include methyl, ethyl, propyl, butyl, amyl, hexyl, heptyl, octyl, nonyl, decyl, dodecyl, tetradecyl, cetyl and corresponding secondary and tertiary alcohols and mixtures thereof. Alcohols produced by hydrogenation of fatty acids or glycerides obtained from animal or vegetable oils and waxes illustrated by coconut oil, castor oil, tallow oil, and the like can also be used. In addition, alcohols produced by the OXO process in which alpha-olefins are catalytically reacted with carbon monoxide and hydrogen under pressure to obtain primary aliphatic alcohols having branched chains are useful. Representative OXO alcohols include isooctyl alcohol, decyl alcohol, tridecyl alcohol, pentadecyl alcohol, and mixtures thereof as illustrated by the alcohol sold under the trademark "NEODOL" by the Shell Chemical Company. In addition, primary alkyl alcohols useful to produce the alkoxylated addition products which are subsequently esterified to produce the fiber lubricants of the invention are produced by the polymerization of ethylene with Ziegler-type catalysts to produce metal alkyls which are subsequently reacted to produce mixtures of straight chain primary alcohols such as those alcohols sold by the Continental Oil Company under the trademark "ALFOL".

Useful initiators also include monofunctional phenols such as phenol itself and various alkyl substituted phenols such as benzyl alcohol, 2-phenylethanol, paramethoxy phenol, the ortho-, meta- and para-cresols, the xylenols or dimethylhydroxybenzenes and the mesitols or trimethylhydroxybenzenes.

A mixture of ethylene oxide and 1,2-propylene oxide is reacted with the initiator in the preferred proportion respectively of about 3:1 to 1:1 by weight, in order that the fiber lubricant compound subsequent to esterification of the above-described addition product remain both fluid and water soluble or dispersible. The addition product obtained is subsequently condensed with an aliphatic, fatty monocarboxylic acid having about 7 to about 22 carbons, preferably about 12 to about 21 carbons and most preferably about 12 to about 18 carbons, in the alkyl chain. Examples of acids usable in this invention are stearic acid, oleic acid, linoleic acid, linolenic acid, caprylic acid, pelargonic acid, capric acid, lauric acid, myristic acid, palmitic acid, hydrated fish oil fatty acid, isostearic acid, and mixtures thereof. It is noted that certain of these fatty acids may be obtained by the saponification of palmitin, stearin and the like or of animal and vegetable oils such as fish oils, olive oils, lards or factions thereof having the desired long carbon chain. Such acids can, if desired, be hydrogenated in order to obtain complete saturation of the chain. For example, the use of saturated acids would reduce the chance of crosslinking during heating of the lubricant at false twist (texturing) processing temperatures and thus promote clean volatilization of the lubricant.

In the esterification reaction of the invention, incomplete esterification of the free hydroxyl groups in the heteric alkoxylated addition product described above occurs because the fatty acid is used at slightly less than the stoichiometric amount required for complete reaction. Residual fatty acid is to be avoided as this would contribute to excessive smoking of the lubricant upon use at fiber processing temperatures and provide a water-insoluble component in the lubricant composition.

The esters of the heteric polyoxyalkylated alcohols of the invention are generally prepared by transesterification of a lower aliphatic, fatty ester prepared from a monofunctional aliphatic alcohol such as those disclosed herein for use as initiators.

The fact that the terminal hydroxyl group, present in analogous compounds of the prior art, is capped and thus no longer available as a site for hydrogen bonding results in a product at a comparable molecular weight having a significantly reduced viscosity as measured at ambient temperature. The lubricants of the invention which do not contain a terminal hydroxyl group are thus superior to the lubricants of the prior art in that products having a high molecular weight can be obtained without a concurrent viscosity increase to an unacceptable level.

The heteric addition product intermediates of the invention based upon the addition of ethylene oxide and 1,2-propylene oxide to a monohydroxy aliphatic alcohol are well known in the art and procedures for their preparation are described, for instance, in U.S. Pat. No. 2,425,755, incorporated herein by reference. Such procedures are also applicable to the heteric alkoxylation utilizing an alkylaryl monohydroxy compound or an aryl compound as an initiator such as a phenol, cresol, xylenol, mesitol, para-methoxyphenol, methylbenzene or aryl phenols such as those described in U.S. Pat. No. 3,578,594, incorporated herein by reference.

Generally, said intermediates are obtained by reacting a mixture of ethylene and 1,2-propylene oxides with a monofunctional compound containing a hydroxyl group having 1 to about 21 carbon atoms such as a monofunctional alcohol initiator selected from the group consisting of monofunctional phenols, alkyl alcohols, aryl substituted alkyl alcohols and alkyl substituted phenols. The intermediates are prepared by the reaction of ethylene oxide and 1,2-propylene oxide in the weight proportion, respectively, of about 3:7 to 4:1, preferably about 3:1 to 1:1, so as to obtain the desired water solubility or dispersibility of the fiber lubricants of the invention upon esterification. The oxides are generally reacted simultaneously to form the mixed polyoxyalkylene addition products as is well known in the art.

Representive and illustrative ester lubricants of the invention are the stearate ester of the potassium hydroxide catalyzed addition product of an equal weight ratio of ethylene oxide and 1,2-propylene oxide utilizing butyl alcohol as initiator; the oleic acid ester of the addition product of 15 moles of ethylene oxide with 5 moles of 1,2-propylene oxide using propyl alcohol as an initiator; the lauric acid ester of the adduct of 20 moles of ethylene oxide with 5 moles of 1,2-propylene oxide using butyl alcohol as an initiator. Additives can be used together with the fiber lubricant of the invention. Such materials are utilized in small amounts, generally in the proportion of about 0.1 to about 5%, preferably about 0.5% to about 2% by weight of the weight of the fiber lubricant of the invention. Such additives can be antioxidants, wetting agents, bactericides, corrosion inhibitors, defoamers, etc.

In general, the capped ester lubricants of the invention exhibit a desirable balance of properties including biodegradability, water solubility and low viscosity such that the products are fluid at ambient temperature as a result of the randomness of the oxyethylene groups in the molecule. By way of illustration, compositions based upon oxyethylene addition products alone are solids at room temperature and compositions based upon oxy-1,2-propylene have little or no solubility in water, exhibit low smoke points and thus would not be suitable as fiber lubricants. In most cases, the fiber lubricant is removed by a scouring operation subsequent to the mechanical and heat treatment of the yarn prior to a dyeing operation. It is, therefore, essential that the fiber lubricating composition utilized by one which is thoroughly removed so as to avoid any irregularities in the dyeing operation which would occur where the textile fiber lubricant is retained on the fiber.

The fiber lubricants of the invention can be applied to the fibers to be lubricated in any convenient manner such as by spray or roll coating and because the fiber lubricants are fluids at ambient temperatures these lubricants can easily be applied without dilution, by applying the fiber lubricants to the fibers immediately after the spinning operation by passing the fibers through a trough or having the fibers make contact with a "kiss" roll rotating in a trough in which the fiber lubricants are contained. It is also convenient to dilute the fiber lubricants of the invention by dissolving or dispersing them in water or diluent. Thereafter, the fiber lubricants can be applied by spray or "kiss" roll using such solutions or by immersion of the fibers in such solutions. While the fiber lubricants of the invention have increased stability to smoking under conditions of use at elevated temperature as compared to the prior art heteric alkoxylates of higher fatty acids, additional stability of the fiber lubricants to elevated temperature processing conditions for the synthetic fibers can be obtained by the addition of conventional stabilizers and antioxidants as is known in the art.

The following test methods were used in evaluating the lubricity of the fiber lubricants of the instant invention. Lubricity of polyester filament yarn having fiber lubricants of the invention applied thereto was evaluated by applying to scoured 150/32 polyester filament producer yarn (drawn) 0.6% lubricant by weight by the following application procedure. An aqueous finish solution or dispersion of the lubricants of the invention, the preparation of which is described in Examples 1 and 2, was made and these lubricants were applied to the yarn using an apparatus in which the yarn is passed at a controlled speed through a continually replenished drop of finish solution of specified concentration. The apparatus used was the Atlas Yarn Finish Applicator sold by the Precision Machine and Development Company. In this procedure the lubricant solution or dispersion is metered to the continually replenished drop of solution utilizing a syringe pump. From the application point of the apparatus, the yarn is fed over an adjustable canter roller which functions to space the yarn over a drying drum used to remove water. The yarn is finally led onto a winding tube. Subsequent to application of the lubricant, the lubricated yarn is conditioned for 16 hours at 65° R.H. and 70° F. before being tested.

The coefficient of friction (f) was determined on a Rothschild F-meter utilizing a 0.313 inch diameter satin-chrome pin as a friction surface and a yarn contact angle of 180°. The yarn speed was varied between 100 and 300 meters per minute. The yarn tension was maintained at a value of 12 grams on the input side as determined by tensiometers on the Rothschild F-meter. The (f) values are determined directly by reading the chart produced by the Rothschild F-meter. For comparison, the same polyester filament yarn was measured for lubricity prior to removal by scouring of the lubricant commercially applied to the yarn. Test results are shown in the following table.

Table I

| Lubricant on 150/32 Polyester Yarn | Speed (meters per minute) | Coefficient of Friction (f) |
| --- | --- | --- |
| Example 1 | 100 | 0.53 |
|  | 200 | 0.58 |
|  | 300 | 0.59 |
| Example 2 | 100 | 0.56 |
|  | 200 | 0.60 |
|  | 300 | 0.61 |
| Unknown Commercial Finish | 100 | 0.54 |
|  | 200 | 0.59 |
|  | 300 | 0.61 |
| No Lubricant | 100 | 0.66 |
|  | 200 | 0.77 |
|  | 300 | —* |

*Could not measure because of yarn breakage.

The following examples illustrate the various aspects of the invention but are not intended to limit it. Where not otherwise specified throughout the specification and claims, temperatures are given in degrees centigrade and parts are by weight.

EXAMPLE 1

Utilizing butyl alcohol as initiator, a polyoxyalkylene addition product intermediate of the invention was prepared by the following procedure. Charge 18 parts n-butyl alcohol at 25° C. to a clean, dry-vacuumed pressure autoclave designed for polyoxyalkylation reactions. Potassium hydroxide (0.6 part) was used as catalyst. The reactor was pressurized with nitrogen at 2 psig and the mixture was heated to 125° C. and held at this temperature for 1 hour. Ethylene oxide and 1,2-propylene oxide (90.8 parts of each) were added to the autoclave and reaction allowed to take place at 125° C. for 2 hours. The intermediate was found to have a hydroxyl number of 75.5 and molecular weight of 743. A 2-liter flask equipped with a mechanical stirrer, thermometer and thermometer well and vacuum distillation take-off assembly was charged under a nitrogen blanket with 573 grams (0.77 mole) of the polyoxyalkylene addition product intermediate prepared above. The contents of the flask were heated to 130° C. and vacuum distillation conducted for a period of 35 minutes at 0.2 millimeter of mercury pressure. The vacuum was relieved with nitrogen and a 1.1-gram quantity of sodium methoxide was added. The vacuum was re-established at 0.2 millimeter of mercury and the mixture further vacuum distilled for 15 minutes. Vacuum was relieved with nitrogen and 206.5 grams of methyl stearate (molecular weight 298.5, 0.69 mole) were added in order to esterify the intermediate. The mixture was carefully evacuated and methanol was readily collected. Periodically, small aliquots of sodium methoxide (0.2 gram) were added whenever the evolution of methanol slowed. After 14 hours, 97% of the theoretical methanol had been collected. The reaction was terminated by the addition of 24 grams of an acidic inorganic silicate. The mixture was filtered and vacuum distilled for ½ hour at 130° C. and 0.2 millimeter. A clear product was obtained having a hydroxyl number of 11.8 and a Gardner color of 1-2.

EXAMPLE 2

The procedure of Example 1 was repeated for the preparation of the polyoxyalkylene addition product intermediate of the invention except that a homologue containing 75% ethylene oxide and 25% porpylene oxide by weight was prepared. This product was transesterified utilizing methyl stearate in the presence of sodium methoxide as catalyst in accordance with the general procedure of Example 1. A clear, viscous fiber lubricant of the invention was obtained having a hydroxyl number of 9.7 and a Gardner color of 1-2.

EXAMPLE 3 (Comparative Example)

A polyoxyalkylene compound fiber lubricant of the prior art was prepared according to the following procedure. A 1-gallon pressure autoclave was charged with 427 grams of a 95% flake stearic acid and 5 grams of a flake 90% potassium hydroxide. The mixture was heated under nitrogen and with agitation to a temperature of 125° C. The liquid mixture of stearic acid, potassium stearate and water was carefully evacuated under a pressure of less than or equal to 10 millimeters of mercury at a point where water could be readily removed by vacuum distillation. After 1½ hours, the vacuum was relieved with nitrogen and the autoclave was pressurized to 5 psig. In a separate pressure bomb, a mixture of 515 grams of ethylene oxide and 515 grams of propylene oxide was blended together. By suitable coupling of the bomb to the autoclave, the mixture in the bomb was conducted into the autoclave and allowed to react with the catalyzed stearic acid at the rate of 200-400 grams per hour. The finished product was treated with acetic acid to neutralize the basic catalyst used. After vacuum distillation to remove traces of moisture, the finished product was discharged. A clear, viscous product was obtained having a hydroxyl number of 59.2 (theoretical 58) and a Gardner color of 1-2.

EXAMPLE 4 (Comparative Example)

Following the same procedure of Example 3, a fiber lubricant of the prior art was prepared having a weight ratio of 75% ethylene oxide and 25% propylene oxide. A clear, viscous material was obtained having a hydroxyl number of 57.5 (theoretical 56) and a Gardner color of 1-2.

EXAMPLE 5 (Comparative Example)

A commercially available white oil having a viscosity of 39 centistokes which is sold for use as a fiber lubricant was evaluated for smoke point. Results are shown in the following table.

Table II

PHYSICAL PROPERTIES OF POLYOXYALKYLENE MONOSTEARATE ESTER FIBER LUBRICANTS

| Example No. | EO/PO Ratio | Hydroxyl No. | Capping Compound | ASTM D 445-74 Viscosity at 100° F., SUS | Gardner Color | Smoke Point (°C.) | Residue after 16 hrs. at 200° C. (%) |
| --- | --- | --- | --- | --- | --- | --- | --- |
| 1 | 1/1 | 11.8 | Butyl Alcohol | 209 | 1-2 | 160 | 0.1 |
| 2 | 3/1 | 9.7 | Butyl Alcohol | 233 | 1-2 | 160 | 0.2 |
| 3 (Control) | 1/1 | 59.2 | — | 297 | 1-2 | 175 | 3.3 |
| 4 (Control) | 3/1 | 57.5 | — | 372 | 1-2 | 176 | 5.2 |

Table II-continued
PHYSICAL PROPERTIES OF POLYOXYALKYLENE MONOSTEARATE ESTER FIBER LUBRICANTS

| Example No. | EO/PO Ratio | Hydroxyl No. | Capping Compound | ASTM D 445-74 Viscosity at 100° F., SUS | Gardner Color | Smoke Point (°C.) | Residue after 16 hrs. at 200° C. (%) |
|---|---|---|---|---|---|---|---|
| 5 (Control) | — | — | — | — | — | 160 | 9.5 |

High temperature volatility was determined by the method described in U.S. Pat. No. 3,544,462, incorporated herein by reference. In carrying out the procedure for determination of smoke point, the sample is heated at a rate so as to provide an increase of 5° C. per minute. The temperature at which the sample first begins to smoke is recorded as the smoke point.

The residue or undesirable varnish-like film left by certain fiber finish compositions was determined by a thin film oxidation-evaporation test which measures the tendency of the finish to build up on hot areas of the equipment. The test is carried out by weighing out 0.2 grams of the finish under test in an aluminum cup and heating for 16 hours at 200° C. in a forced draft oven.

The fiber lubricants of Examples 1 and 2 are thus shown to be relatively stable in comparison with conventional mineral oil fiber finishes; the inventive fiber finishes of Examples 1 and 2 being relatively stable upon heating up to a temperature of 160° C. at which point essentially complete volatilization occurs. At 200° C., for example, the finishes of Examples 1 and 2 when deposited upon hot surfaces will volatilize readily. Use of the finishes will obviously result in less cleanup and machine maintenance being required as a result of the deposition of undesirable varnish-like residues on machine parts.

While this invention has been described with reference to certain specific embodiments, it will be recognized by those skilled in the art that many variations are possible without departing from the scope and spirit of the invention.

The embodiments of the invention in which an exclusive property or privilege is claimed are defined as follows:

1. A lubricated thermoplastic, synthetic fiber comprising a polyester or nylon fiber having incorporated thereon a lubricating composition comprising a heteric polyoxyalkylene monoester capable of volatilizing at 200° C. having the formula:

$$R-\overset{O}{\underset{\|}{C}}-(A)_n-R'$$

wherein R is an aliphatic radical having about 7 to about 22 carbon atoms; A is a mixture of oxyethylene and oxypropylene residues derived from the reaction of ethylene oxide and 1,2-propylene oxide in the respective ratio by weight of 3:7 to 4:1; n has a value to produce a molecular weight of from about 300 to about 3000 and R' is the residue of a monofunctional aryl alcohol or a monofunctional alkyl or arylalkyl alcohol having 1 to about 21 carbon atoms in the alkyl chain.

2. The lubricated polyester fiber of claim 1 having applied thereto from about 0.1 to about 1.5% by weight of said polyoxyalkylene composition based upon the weight of said fiber.

3. The lubricated polyester fiber of claim 2 wherein A is a mixture of oxyethylene and oxypropylene residues derived from the reaction of ethylene oxide and 1,2-propylene oxide in the respective ratio by weight of 3:1 to 1:1, R' is the residue of butyl alcohol, and said polyoxyalkylene composition has a molecular weight of about 400 to about 1400.

4. The process of lubricating thermoplastic, synthetic fibers comprising the application to said fibers of a heteric polyoxyalkylene monoester lubricant capable of volatilizing at 200° C. having the formula:

$$R-\overset{O}{\underset{\|}{C}}-(A)_n-R'$$

wherein R is an aliphatic radical having from 7 to 22 carbon atoms; A is a mixture of oxyethylene and oxypropylene residues derived from the reaction of ethylene oxide and 1,2-propylene oxide in the respective ratio by weight of 3:7 to 4:1; n has a value to produce a molecular weight of about 300 to about 3000 and R' is the residue of a monofunctional aryl alcohol or a monofunctional alkyl or arylalkyl alcohol having 1 to about 21 carbon atoms in the alkyl chain.

5. The process of claim 4 wherein said lubricant is an ether-capped polyoxyalkylene monoester derived from stearic acid which is applied to said fibers by roll.

6. The process of claim 5 wherein said lubricant is prepared by the reaction of ethylene oxide and 1,2-propylene oxide in the respective weight proportions of 3:1 to 1:1 and R' is the residue of butyl alcohol.

7. A synthetic fiber lubricating composition comprising a heteric polyoxyalkylene monoester condensation product capable of volatilizing at 200° C. having the formula:

$$R-\overset{O}{\underset{\|}{C}}-(A)_n-R'$$

wherein R is an aliphatic radical having about 7 to about 22 carbon atoms; A is a mixture of oxyethylene and oxypropylene residues derived from the reaction of ethylene oxide and 1,2-propylene oxide in the respective ratio by weight of 3:7 to 4:1; n has a value to produce a molecular weight of about 300 to about 3000 and R' is the residue of a monofunctional compound containing an OH group and having 1 to about 21 carbon atoms in the alkyl chain.

8. The composition of claim 7 wherein R is the residue of stearic acid and R' is the residue of a monofunctional aryl alcohol or a monofunctional alkyl or arylalkyl alcohol.

9. The composition of claim 8 wherein R' is the residue of butyl alcohol and said product has proportions by weight of the residues of ethylene oxide and propylene oxide of, respectively, about 3:1 to about 1:1 and a molecular weight of about 400 to about 1400.

* * * * *